United States Patent
Martin et al.

(10) Patent No.: US 8,649,242 B2
(45) Date of Patent: Feb. 11, 2014

(54) INSONIFICATION DEVICE THAT INCLUDES A THREE-DIMENSIONAL NETWORK OF EMITTERS ARRANGED IN AT LEAST TWO CONCENTRIC SPIRALS, WHICH ARE DESIGNED TO GENERATE A BEAM OF HIGH-INTENSITY FOCUSSED WAVES

(75) Inventors: Yves Martin, Beynost (FR); Mathieu Pernot, Paris (FR); François Varray, Castelnau le Lez (FR)

(73) Assignee: Super Sonic Imagine (FR)

( * ) Notice: Subject to any disclaimer, the term of this patent is extended or adjusted under 35 U.S.C. 154(b) by 711 days.

(21) Appl. No.: 12/742,086

(22) PCT Filed: Nov. 12, 2008

(86) PCT No.: PCT/EP2008/065419
§ 371 (c)(1), (2), (4) Date: Nov. 17, 2010

(87) PCT Pub. No.: WO2009/062977
PCT Pub. Date: May 22, 2009

(65) Prior Publication Data
US 2011/0051554 A1    Mar. 3, 2011

Related U.S. Application Data

(60) Provisional application No. 61/006,404, filed on Jan. 11, 2008.

(30) Foreign Application Priority Data

Nov. 12, 2007   (FR) ...................................... 07 58964

(51) Int. Cl.
*G01S 15/89*   (2006.01)
(52) U.S. Cl.
CPC ..................................... *G01S 15/89* (2013.01)

USPC ............................................................ 367/87
(58) Field of Classification Search
USPC ............................................................ 367/87
See application file for complete search history.

(56) References Cited

U.S. PATENT DOCUMENTS 5,713,356 A    2/1998  Kruger
(Continued)

FOREIGN PATENT DOCUMENTS

EP               0 807 990 A    11/1997
(Continued)

OTHER PUBLICATIONS

Sumanaweera, et al. "A Spiral 2D Phased Array for 3D Imaging", 1999 IEEE Ultrasonics Symposium, vol. 2, 2000, pp. 1271-1274.

(Continued)

*Primary Examiner* — Isam Alsomiri
*Assistant Examiner* — James Hulka
(74) *Attorney, Agent, or Firm* — Caesar, Rivise, Bernstein, Cohen & Pokotilow, Ltd.

(57) ABSTRACT

The invention concerns a device (1) for the insonification of an environment or medium, which is designed to generate a beam of focussed waves around a point in a so-called focus zone (20), used for imaging the medium or changing the properties of the medium, with the insonification device (1) having an intrinsic or extrinsic support structure on which is installed a network of a predetermined number of ultrasound transducers (12) that are designed to be controlled independently for generation of the focussed wave beam.

According to the invention, the transducers (12) used for the generation of the focussed wave beam are located in a homogeneous spatial distribution along at least two concentric spirals (11) that are wound onto a three-dimensional concave area (10) whose shape and size are chosen to allow optimal focusing of the beam at a predetermined focal length, and whose concave side is oriented toward the focus zone (20).

10 Claims, 9 Drawing Sheets

(56) References Cited

U.S. PATENT DOCUMENTS

| | | | |
|---|---|---|---|
| 6,102,860 A | 8/2000 | Mooney | |
| 6,205,224 B1 * | 3/2001 | Underbrink | 381/92 |
| 6,583,768 B1 * | 6/2003 | Underbrink | 343/893 |

FOREIGN PATENT DOCUMENTS

| | | | |
|---|---|---|---|
| EP | 0 978 822 A | | 2/2000 |
| EP | 1 761 104 A | | 3/2007 |
| GB | 2 347 043 A | | 8/2000 |
| WO | WO 2009062977 A1 * | | 5/2009 |

OTHER PUBLICATIONS

Goss et al. Sparse Random Ultrasound Phased Array for Focal Surgery, IEEE Transactions on Ultrasonics, Ferroelectrics and Frequency Control, IEEE Service Center, vol. 43, No. 6, Nov. 1996, pp. 1111-1120.

Lockwood et al. "Optimizing the Radiation Pattern of Sparse Periodic Two-Dimensional Arrays", IEEE Transactions on Ultrasonics, Ferroelectrics and Frequency Control, IEEE Service Center, vol. 43, No. 1, Jan. 1996, pp. 15-19.

International Search Report for International Application No. PCT/EP2008/065419.

* cited by examiner

INSONIFICATION DEVICE THAT INCLUDES A THREE-DIMENSIONAL NETWORK OF EMITTERS ARRANGED IN AT LEAST TWO CONCENTRIC SPIRALS, WHICH ARE DESIGNED TO GENERATE A BEAM OF HIGH-INTENSITY FOCUSSED WAVES

CROSS-REFERENCE TO RELATED APPLICATIONS

This national stage application claims the benefit under 35 U.S.C. §371 of International Application No. PCT/EP2008/065419 filed on Nov. 12, 2008, entitled AN INSONIFICATION DEVICE THAT INCLUDES A THREE-DIMENSIONAL NETWORK OF EMITTERS ARRANGED IN AT LEAST TWO CONCENTRIC SPIRALS, WHICH ARE DESIGNED TO GENERATE A BEAM OF HIGH-INTENSITY FOCUSSED WAVES, which in turn takes its priority from French Application No. 07 58964 filed on Nov. 12, 2007 and U.S. Provisional Application No. 61/006,404 filed on Jan. 11, 2008, and all of whose entire disclosures are incorporated by reference herein.

BACKGROUND OF THE INVENTION

1. Field of Invention

This present invention relates to the general area of insonification devices that are designed to generate a beam of focussed waves, especially in the ultrasound frequency domain.

2. Background of the Invention

Such insonification devices, very frequently called probes, are used to perform the imaging of an environment or a medium, or indeed to modify the properties of this environment. For example, an insonification device according to the invention can be used to raise the temperature of a very precise zone corresponding to the focus zone, where one wishes to focus the beam of ultrasound waves. These devices can be used in particular not only in the medical field but also in the areas of underwater imaging and communication, imaging of the terrestrial subsoil, or indeed in the area of non-destructive testing of materials.

In order to achieve focussing, one is familiar with the use of N ultrasound sources that are controlled independently in phase and in amplitude by electronic means, so that their overall energy reaches a local maximum in a predetermined focus zone.

The positioning of the transducers, in relation to the environment, and in relation to the focus zone, is important since it ensures the effectiveness and the safety of the action performed by virtue of the insonification device, to image or to modify the properties of the environment. In fact the field diffracted by all of the transducers can be modified significantly in accordance with the positioning of the transducers and their geometry.

Thus, when the layout of the transducers exhibits symmetries, this results in the presence of significant side lobes. This reduces the quality of the focus. In particular, points that are outside of the focus zone can then receive significant quantities of energy, when in fact these zones should not be subjected at all to the energy emitted by the insonification device.

Thus, the document entitled "Sparse Random Ultrasound Phased Array for Focal Surgery", Goss et al., IEEE Transactions on Ultrasonics, Ferroelectrics, and Frequency Control, Vol. 43, No. 6, November 1996, proposes to generate a network of transducers in a virtually random manner over a three-dimensional concave area, the only condition being to maintain[S1] of a minimum distance between the different transducers.

The three-dimensional concave area is used to perform pre-focussing prior to the additional electronic focussing that will then be performed by applying individually calculated phase delays to each transducer. This application of phase delays is commonly employed in the ultrasound area. These controls are achieved by means of a limited number of independent electronic channels, which also limits the number of transducers that can be deployed in the insonification devices used by the invention.

The random distribution of the transducers, as described in the aforementioned document, nevertheless has the drawback of proposing an inhomogeneous layout for all of the transducers in the three-dimensional concave area. In fact certain transducers can be placed very close and others very far apart. This leads to a locally heterogeneous density of the energy emitted over all of the emission area.

Such heterogeneity of the pressure field generally leads to the appearance of acoustic energy maxima, also called "hot spots". These maxima can be large at the entry of the ultrasound beam into the environment, and can give rise to irreversible and undesirable damage to the environment or to its surface. They can also be the source of parasitic waves returned by the environment during imaging of the latter.

The side lobes appear whenever the transducers, which are not infinitely small, are separated by a distance greater than some fractions of wavelengths. The limited number of transducer control channels, and the need to create a probe of sufficiently large size, necessarily results in the appearance of unwanted hot spots.

Such a problem is exacerbated by the shape of the three-dimensional concave area, which has been precisely designed to achieve a focus.

PURPOSE AND SUMMARY OF THE INVENTION

The main aim of this present invention is to overcome the drawbacks of the known insonification devices by proposing a device for the insonification of an environment, which is designed to generate a beam of focussed waves around a point in a so-called focus zone, this being used for imaging of the environment or changing the properties of the environment, where the insonification device includes an intrinsic or extrinsic support structure on which is installed a network of at least ten ultrasound transducers that are designed to be controlled independently for generation of the focussed beam of waves, characterised in that the active transducers for generation of the focussed beam of waves are large transducers with sizes greater than one wavelength, located along at least two wound concentric spirals over a three-dimensional concave area, with the winding of the spirals and the positions of the transducers on the spirals being chosen so that the spatial distribution of the transducers over the three-dimensional surface is homogeneous, with the shape and the size of the three-dimensional surface also being chosen to allow optimal focusing of the beam at a predetermined focal length, and with the concave side of the three-dimensional surface being oriented toward the focus zone.

In such an insonification device, the distribution of the transducers in a spiral has the advantage of not creating symmetry, while still providing a generally regular distribution in which it is easy to control the distances between the transducers.

In the context of a distribution of the transducers over a three-dimensional surface, the use of a spiral to distribute the transducers allows one to achieve an insonification that has no undesirable hot spots in the near field, while also enabling one to achieve optimum focussing of the beam at a predetermined focal length, since it is supported by the three-dimensional character of the device itself.

The use of geometrical pre-focussing enables one to obtain a large antenna gain and to optimise the intensity of the ultrasound beam at the focal point. This geometrical pre-focussing is performed by positioning the transducers on a three-dimensional surface, and in particular on a portion of a sphere whose centre coincides with the focal point, or on a portion of an ellipsoid of revolution.

The homogeneity of the spatial distribution of the transducers is important in order to ensure effectiveness, and to guarantee the operational safety of the insonification device according to the invention, which means that a homogeneous spatial distribution of the mean energy over the three-dimensional concave area must in fact be achieved.

The homogeneity of the spatial distribution of the transducers is ensured by several parameters, namely the pitch of the spiral, the distance between two consecutive transducers on a given spiral and between two spirals, the number of transducers to be distributed, the size of the insonification device, and the nature of the projection performed if the device is designed from a flat spiral.

As well as placing the transducers along spirals, which avoids the presence of hot spots, the homogeneous spatial distribution of the transducers therefore ensures a spatially homogeneous distribution of energy on average over the three-dimensional concave area. By "homogeneous spatial distribution" of the transducers is meant the fact that their spatial density is homogeneous over the three-dimensional surface.

To the extent that it also involves having homogeneity in the energy distribution, homogeneity on average can be taken as meaning on a scale greater than that of the individual transducer.

The use of two concentric spirals wound symmetrically on the same three-dimensional concave area, and used to distribute the ultrasound transducers, results in concentration of the energy emitted by the insonification device at the chosen point of focus. As has been observed by the inventors, this also results in a significant reduction of the energy in the secondary lobes observed in the near field. In fact with the use of a single spiral, the energy emitted is for the most part distributed along a spiral winding in the direction of the focal point. The use of two concentric spirals allows the energy to be distributed on two spirals, and therefore in a more homogeneous manner, with an intensity that is weaker locally. This original feature is particularly important for the invention as it enables to fit with the safety requirements specific to the insonification device according to the invention.

According to a particular characteristic of the invention, the three-dimensional surface is a portion of a sphere whose radius is equal to the wanted focal length.

Such a characteristic is just what is needed in order to achieve a focus in the three-dimensional concave area, which is particularly simple and effective, since the focus zone that is natural in relation to the geometry of the device is then the centre of the sphere.

According to one advantageous characteristic, the number of spirals on which the transducers are distributed is between two and twenty and, preferably, between seven and thirteen spirals.

An increase in the number of concentric spirals used, while still preserving a homogeneous spatial distribution of the transducers along the spirals, allows the energy to be distributed on most of spirals, constituting a more homogeneous pattern. The energy is then distributed in a more homogeneous manner with an intensity that is weaker locally. An increase in the number of spirals increases this effect.

According to a particular characteristic of the invention, the spiral or spirals are flat, and are arranged in a plane and projected onto the three-dimensional concave area.

The flat spiral can be chosen from, spirals of the Archimedes, exponential, or power angle types, etc. Different types of projection can also be used. When one or more Archimedes spirals is employed, and when the three-dimensional concave area has a pronounced concave side, the projection is then preferably stereographic. An orthogonal projection can be advantageous whenever the concave side is not very pronounced.

This achieves a homogeneous distribution of the spirals lines between a central part and a peripheral part of the three-dimensional concave area, in particular when this surface is a portion of a sphere.

According to one particular characteristic, the spiral or spirals can be spherical in form, determined directly on a sphere. For example, Clelia spirals can be used as well as the three-dimensional curves described as follows by rectangular or polar coordinates, where $\theta$ is the angular variable and R the radius of the sphere:

$$x = R \cos m\theta \cos \theta; \quad y = R \cos m\theta \sin \theta; \quad z = R \sin m\theta.$$

In the case where a three-dimensional surface in the form of portion of a sphere is used, this characteristic means that the spiral is not deformed during projection onto the three-dimensional surface.

In general, the invention is implemented by means of an extrinsic support structure. This structure then includes a three-dimensional concave area according to the characteristics of the invention, and on which the transducers are placed by inserting into orifices provided for this purpose. The transducers can then be controlled independently and individually. In such a case, the orifices are created through the extrinsic support structure, following the trajectory of one or more spirals, as specified in the invention.

According to one particular characteristic of the invention however, the support structure is intrinsic, and is composed of a piezoelectric or semiconductor material whose surface is three-dimensional and concave, where the piezoelectric or semiconductor material is divided into a multiplicity of independent transducer elements of which only some, located along at least two spirals wound onto the three-dimensional concave area of the piezoelectric or semiconductor material, are activated in order to create the focussed beam.

With such a construction, it is possible to create an insonification device according to the invention, directly from a standard or semiconductor piezoelectric material, such as a Capacitive Micromachined Ultrasonic Transducer (CMUT) device for example, which one will have formed on a three-dimensional concave area specifically designed for optimal focussing of the wave beam at a wanted focal length. The invention then consists of activating only a certain number of zones of the transducer, which are composed of a material such as piezoelectric or semiconductor substances, so as to constitute elementary transducers, with these zones of the piezoelectric material being located along two or more spirals in accordance with the principle of the invention.

The minimum distance between any two transducers is advantageously of the order of the wavelength of the radiation emitted by the device.

According to another characteristic of the invention, the size of the three-dimensional concave area is determined according to the minimum size of the focal footprint wanted around the focus point.

To the extent that the given number of transducers employed, of a given dimension, is generally restricted to the number of electronic channels available to control them individually, their density will be inversely proportional to the size of the three-dimensional concave area over which they are distributed. Thus, the size of the three-dimensional concave area is directly correlated to the minimum size of focal footprint wanted around the focus point. Thus the choice of the size of the insonification device in accordance with the size of the focal footprint wanted is a characteristic that needs to be protected, and it is particularly important in the particular context where a limited number of independent commands can be delivered.

According to a particularly advantageous characteristic of the invention, with the distribution of the transducers along the spirals having been determined, their position, central or lateral, in relation to the geometrical curve formed by the spirals, is determined randomly and independently for each transducer on either side of the geometrical curve of each spiral in a geometrical segment perpendicular to the curve of the spiral and of a length that is less than or equal to the wavelength.

With such a characteristic, the positioning of the transducers in a corridor surrounding the linear structure of the imaginary spirals used to distribute the transducers, and the random character of this positioning of the transducers, is used to introduce an additional particularly advantageous break in the symmetry.

The effects of this symmetry break are particularly observable when the focussing is accomplished by electronic beam steering outside the axis of the probe, that is to say on the Ox and Oy axes. In fact in this case where a phase law is applied to the transducers in order to move the focus point, we generally observe a symmetrical lobe of the focal footprint in relation to the focal axis of the transducer determined by its geometry, and this lobe is precisely reduced to a significant degree by the introduction of a random character in the positioning of the transducers on either side of the linear structure of the spiral.

BRIEF DESCRIPTION OF THE DRAWINGS

Other characteristics and advantages of this present invention will emerge more clearly on reading the description that follows, and which is provided in an illustrative and non-limiting manner, with reference to the appended drawings in which.

DETAILED DESCRIPTION OF THE IMPLEMENTATION OF THE INVENTION

Figure 1:
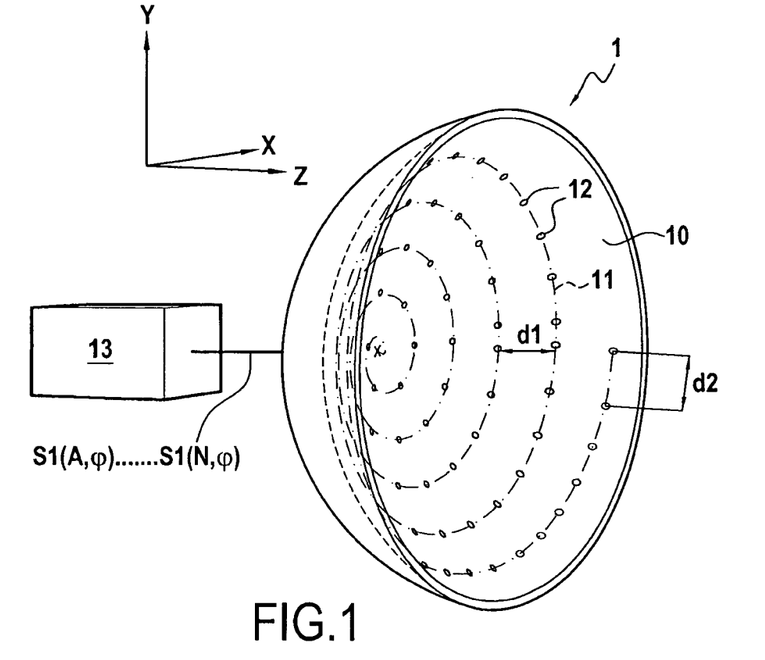
FIG. 1 represents a view in schematic perspective of an insonification device illustrating the principle of the invention but with a simplified drawing that does not correspond to the invention.

FIG. 1 represents a first embodiment of an insonification device 1 illustrating the principle of the invention but with a simplified drawing that does not correspond to the invention. This insonification device 1 includes a three-dimensional concave area 10 in the form of a portion of a sphere, with centre O, on which is wound a spiral 11, along which are placed N transducers 12 at regular intervals.

It will be observed that the spiral 11 represented in this figure is really only an imaginary element which is embodied by the distribution of the transducers 12.

The concave side of the three-dimensional concave area 10 is oriented toward a so-called natural focus zone of the insonification device 1, which here is the zone that is equidistant from all the transducers 12, meaning the zone surrounding the centre O of the sphere supporting the three-dimensional concave area 10.

Figure 2:
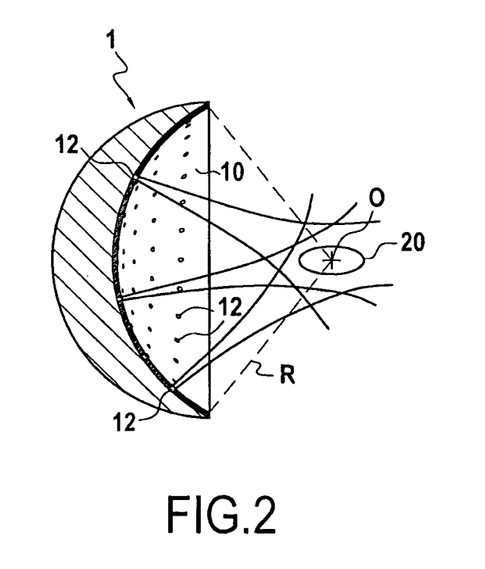
FIG. 2 is a section of the insonification device in plane OXZ of FIG. 1, in which the focussing principle is explained for an insonification device exhibiting a specifically designed geometry.

The focussing principle, and that of the location of the natural focus zone, is illustrated in FIG. 2, representing a section of the insonification device 1 of FIG. 1 in the OYZ plane. On this figure, each transducer 12 gives rise to a more-or-less conical pressure field.

With each transducer 12 being placed on the sphere-shaped three-dimensional concave area 10, they are all oriented toward the centre O of this sphere and therefore generate a maximum pressure field in the vicinity of this point O. A focus zone 20 is thus created around this focal point O.

The geometry of the insonification device 1 is therefore particularly appropriate for insonification of this focus zone 20.

The distance at which this focus zone 20 is located in relation to the insonification device 1 is chosen beforehand, and the curvature, or, here, the radius R, of the three-dimensional concave area 10 is then chosen in accordance with a wanted focal length during the design of the insonification device 1.

Next, the well-known techniques of introducing individually-calculated phase delays into the signals emitted by each of the transducers 12 can be used to move the zone of maximum pressure in the vicinity of the natural focus zone 20, represented in FIG. 2. Certain latitude is then provided by the insonification device 1, in order to move the zone of maximum pressure on the Z axis and/or on the X and Y axes. The movements of the zone of maximum pressure along the OX, OY and OZ axes correspondent to the creation of an electronic steering of the beam of focussed waves.

As illustrated schematically in FIG. 1, in order to control the emission of the transducers 12 independently, the insonification device 1 is connected to a control module 13. This control module 13 includes a number N of electronic channels, each designed to individually control one of the N transducers 12 of the insonification device 1 represented in FIG. 1.

Since each transducer 12 is generally controllable in phase $\phi$ and in amplitude A, the control module 13 is therefore designed to send N signals, namely $S1(A,\phi)$ to $SN(A,\phi)$.

The number N of independent electronic channels available at the date of submission of the patent application is 512 in general. Nevertheless, the principle of the invention remains valid whatever this number N may be, even if it is increased in the future as long as the distance between two transducers is not less than one wavelength.

We also know that the distance between the transducers is generally greater than one wavelength, since it is necessary to use quite wide transducers in order to generate sufficiently high ultrasound energy at the focal point with a limited number of transducers.

Such transducers then have sizes that are greater than a few wavelengths of the central emission frequency, and their centres are therefore separated at least by their size, which is greater than the wavelength of the central emission frequency. In particular, the transducers concerned by the invention are of a characteristic size that is greater than two wavelengths at the central emission frequency. For example, transducers with a diameter of 6 mm can be used, which already corresponds to four times the wavelength when the transducers are operating with a frequency of 1 MHz in water or soft tissue.

Figure 3:
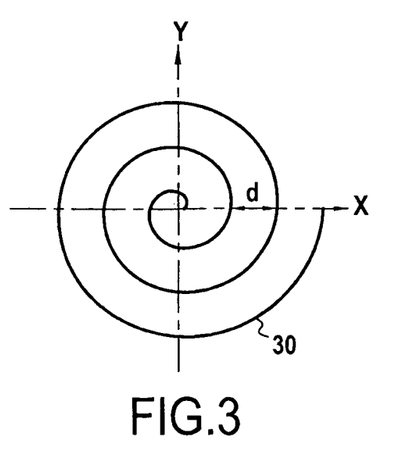
FIG. 3 gives an example of a flat spiral.

FIG. 3 proposes an example of a flat spiral 30 of constant pitch. These spirals are known as Archimedes spirals or Archimedes screws. In such a spiral, the distance d between two consecutive points determined by the intersection of an axis (OX) or (OY) with the spiral 30, is always constant.

The equation of the spiral is $\rho=a\theta+b$, where $\rho$ is the polar radius, $\theta$ is the angle concerned, and a is the pitch of the spiral. The value of b corresponds to the starting point of the spiral 30. This starting point is the centre of the spiral when b=0, which is the case in FIG. 3.

According to the invention, the N transducers 12 are then distributed along this spiral 30. As we have seen previously, the number N of transducers 12 is generally determined from the number of independent electronic channels provided by the control module 13.

The distance between two consecutive transducers 12 on the spiral is chosen so as to comply with the minimum physical distance between the two transducers 12 and a homogeneous distribution of the transducers 12 over the three-dimensional surface 10. This homogeneous distribution takes into account the pitch a of the spiral 30 which determines the minimum distance observed between two transducers 12 supported by two successive turns of the spiral 30 on a given straight line passing through the centre of the spiral 30.

The pitch of the spiral 30, as well as the distribution of the transducers 12 along this spiral 30, is therefore determined in accordance with the overall size of the insonification device 1 and the number N of transducers that can be controlled independently. In fact, in order to comply with the homogeneity of distribution of the transducers 12, the latter are advantageously separated from each other by a distance that is constant and identical over the entire three-dimensional surface. This means that the pitch of the spiral is more-or-less the same as the distance separating two consecutive transducers 12 supported by the spiral 30.

Figure 4:
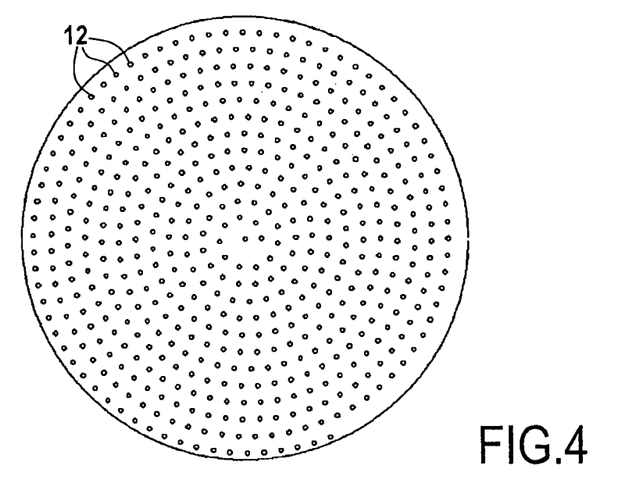
FIG. 4 is an example of the distribution of the transducers over a plane surface, and represents a front view of the insonification device of FIG. 1 and having a network of ultrasound transducers placed along a flat spiral projected into the three-dimensional volume of the insonification device.

This is illustrated in FIG. 4, where N=512 transducers are placed in a flat spiral 30. This distribution of the transducers 12 is projected onto the three-dimensional concave area 10 of the insonification device 1.

Figure 5:
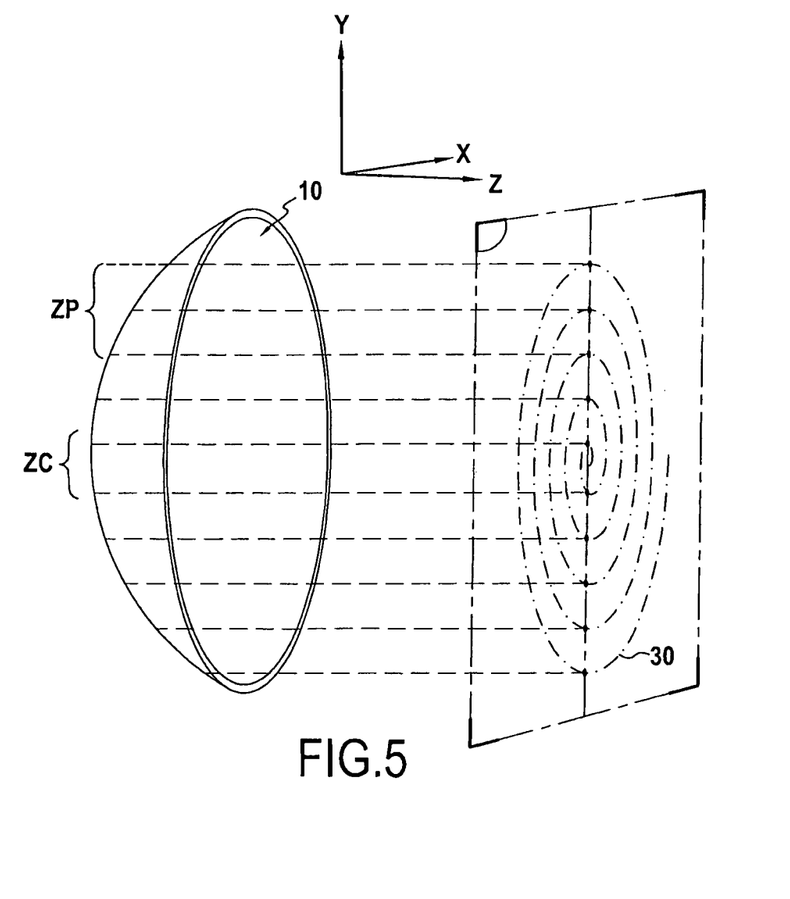
FIG. 5 illustrates the density disparity of the transducers, when a flat spiral is projected on a three-dimensional surface.

FIG. 5 presents the principle of an orthogonal projection onto a three-dimensional concave area 10 in the form of a spherical cap. It can then be seen that the central zone ZC of the spherical cap and the peripheral zone ZP then necessarily have distinct concentrations of transducers 12.

The central part of the spherical cap ZC will have a high concentration of transducers 12, while the peripheral part ZP will have transducers 12 that are more distant, since the turns of the spiral 30 move away from each other during projection. The concentration of transducers 12 on the periphery is therefore lower. This inhomogeneity of distribution of the transducers 12 leads to a concentration of the energy emitted at the central zone ZC of the spherical cap.

The accumulation of energy at the central zone ZC can cause damage to the environment or to the surface of the latter. In fact it is possible to observe zones where the intensity of received energy causes heating at the surface of the environment that is located in the near field of the device 1.

The spiral 30 of FIG. 3 can also be projected according to an inverse stereographic projection onto the three-dimensional concave area 10. The point of reference of the projection is then advantageously chosen to be located on the sphere that includes the three-dimensional concave area 10.

The stereographic projection results in a better distribution of the transducers 12 between the central part ZC and the peripheral part ZP of the three-dimensional concave area 10.

Figure 6:
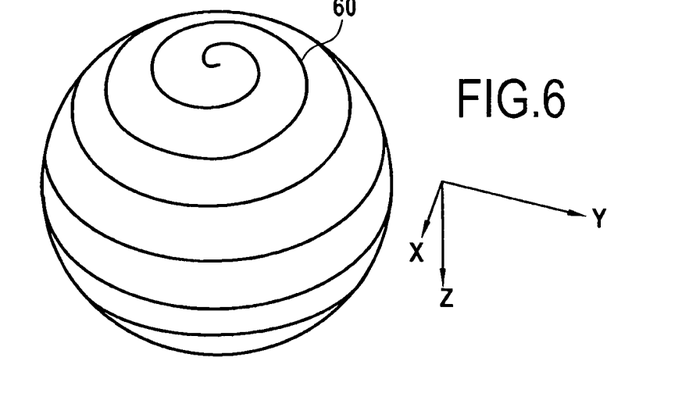
FIG. 6 represents a spherical spiral that can be used in the creation of an insonification device according to the invention.

In a second principle of implementation, a spherical spiral 60, as represented in FIG. 6, is used directly to place the transducers 12 on the three-dimensional concave area 10 in the form of a portion of a sphere of the insonification device 1.

FIG. 6 presents a Clelia spiral 60. The equation of this spiral 60 corresponds to the movement of a point M rotating at a constant speed around the polar axis of a sphere on the surface of the latter.

In rectangular coordinates, the following equations describe this movement and therefore the spiral 60:

$$x = R \cos m\theta \cos \theta; \quad y = R \cos m\theta \sin \theta; \quad z = R \sin m\theta$$

In these equations, x, y and z are the rectangular coordinates of the point M, R is the radius of the sphere, θ is the angle of the point M in the XOY plane, and m is a parameter used to determine the overall appearance of the volume obtained. In the case of FIG. 6, parameter m is chosen so as to be able to create a spherical spiral.

In a manner that is similar to what has been described previously, a portion of this spherical spiral 60, corresponding to the portion of a sphere in FIG. 1, is then used to place the N transducers 12. The surface distribution of the transducers 12 then obtained is quite uniform between the central part ZC and the peripheral part ZP of the sphere portion. The distance between two successive turns of the spiral are then effectively constant when one follows a perimeter of the sphere passing through the centre of the spiral 60 while it increases in the case of projection of the flat spiral 30 on the three-dimensional surface 10.

Figure 7:
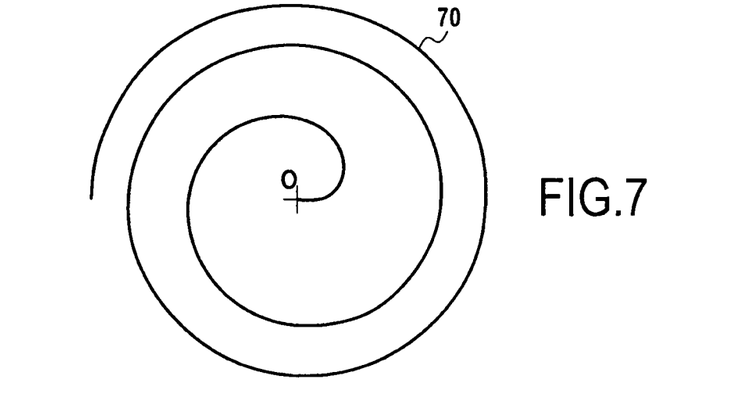
FIG. 7 represents a flat spiral of power angle equation particularly designed for orthogonal projection into a three-dimensional concave area.

In a third implementation, illustrated in FIG. 7, given that the use of an orthogonal projection has the effect of expanding the periphery of the network of transducers 12 placed on a flat Archimedes spiral, a flat spiral of power angle equation can be used so as to obtain a flat spiral 70 that is expanded at the centre and tightened up at the periphery.

The equation of such a spiral is as follows:

$$\rho = a \cdot \theta^b$$

When such a spiral 70 is projected orthogonally, the pitch of the spherical spiral obtained can be substantially constant, and thus results in a homogeneous distribution over the three-dimensional concave area 10. The choice of parameters a and b enables one to precisely match the shape of the spiral 70 to the curvature of the three-dimensional concave area 10.

In general, the distribution of the transducers 12 according to the principle of the invention, which is along a three-dimensional spiral, has the advantage of generating no symmetry, while also allowing a regular and homogeneous distribution of the transducers. In this distribution, it is possible to control the distances between the transducers 12 with the pitch of the spiral and the distance between any two consecutive transducers 12 on the spiral.

Figure 8:
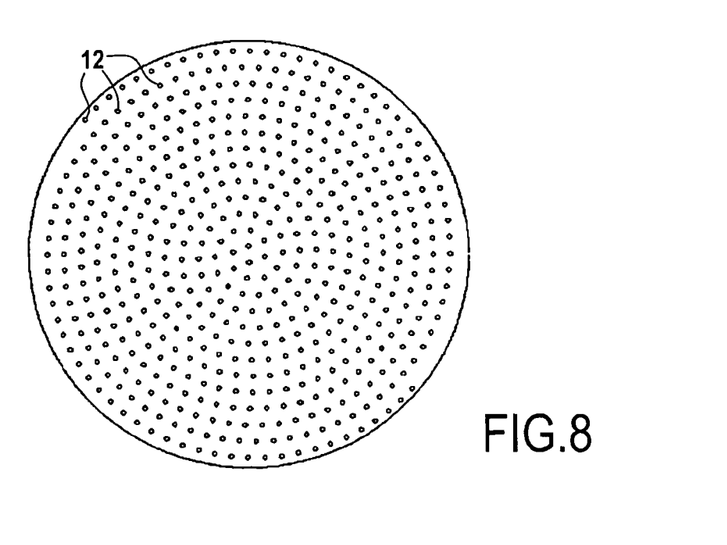
FIG. 8 is a front view of an insonification device according to the invention having a network of transducers placed along two concentric spirals projected onto the three-dimensional surface of the insonification device.

FIG. 8 represents an embodiment of the invention. According to this embodiment, two concentric spirals are used to determine the distribution of the N transducers 12. The number (N=512) is identical to that of FIG. 4. The two spirals are symmetrical in relation to a vertical axis and therefore start their windings at 180° with respect to each other. The use of these two spirals, according to the invention, recentres the centre of gravity of the overall energy emitted by the insonification device of FIG. 4, for a given number of transducers.

In this embodiment of the invention, as the basis of distribution of the transducers, it is possible to use each of the types of spirals mentioned previously, namely flat, derived from various equations and projections, or spherical. The start angle of the spirals, as well as their pitch, are designed so that they do not overlap and in order to obtain a homogeneous distribution of the transducers, with the distance between two consecutive transducers 12 on a given spiral being more-or-less equal to the distance between the adjacent turns of the two spirals.

Figure 9:
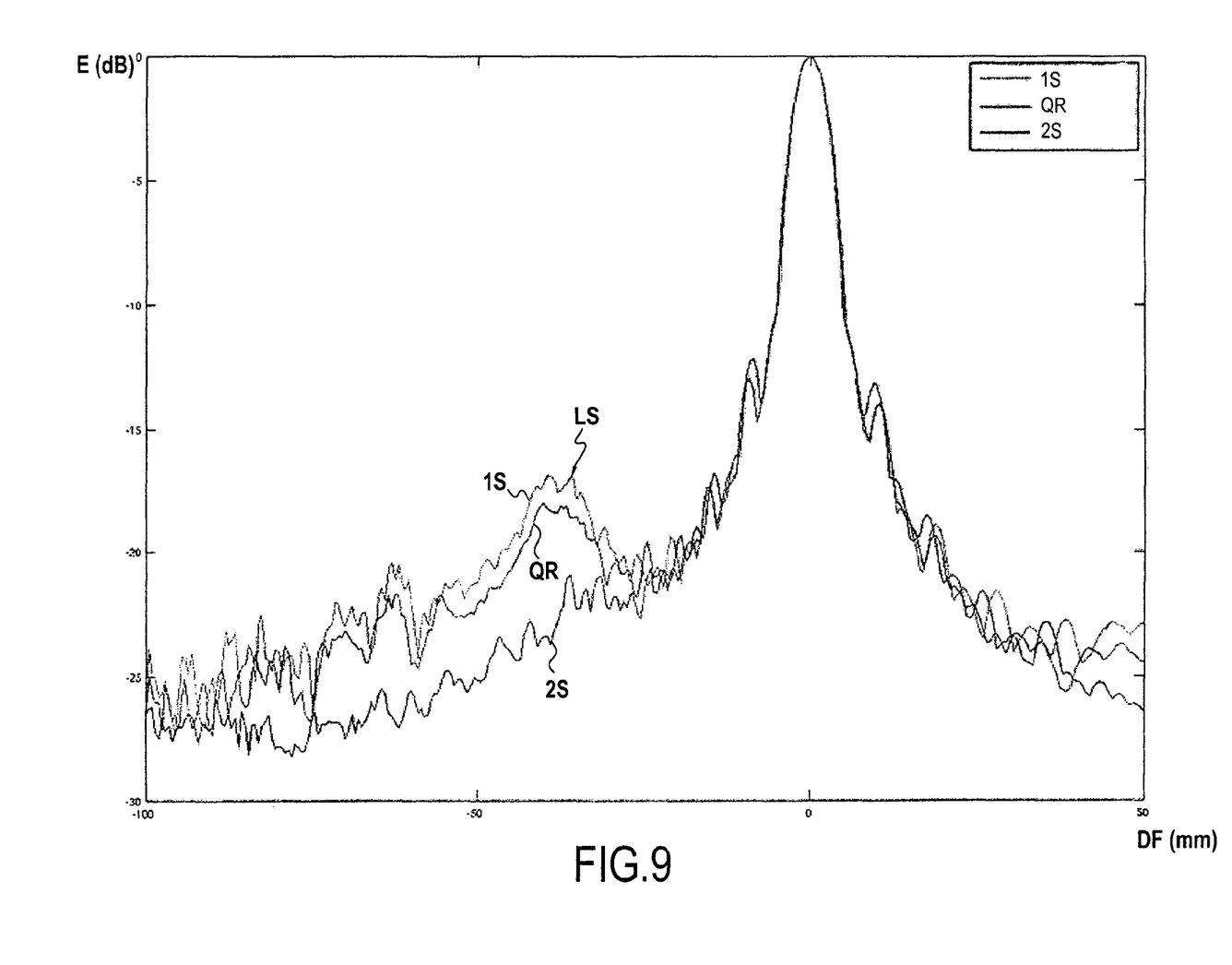
FIG. 9 represents the energy received into the environment in the near field, expressed in decibels in relation to the energy at the focal point, around the focal axis, as a function of the distance to the focal point, for an insonification device of the prior art, for an insonification device with only one spiral and for one embodiment of an insonification device according to the invention.

FIG. 9 shows the characteristics of the near field for three types of distribution of the transducers 12 in a single spiral 1S, in a semi-random distribution QR and in a double spiral 2S according to the invention.

The curves represent the energy E observed as a function of the distance to the focal point DF. One can see the presence of an approximately similar secondary lobe LS for the insonification device with a single spiral 1S and for the insonification device with a semi-random distribution QR of the transducers 12.

On the other hand, it can be seen that the use of a double spiral 2S according to the invention significantly reduces, or even eliminates, such a secondary lobe LS.

Figure 10:
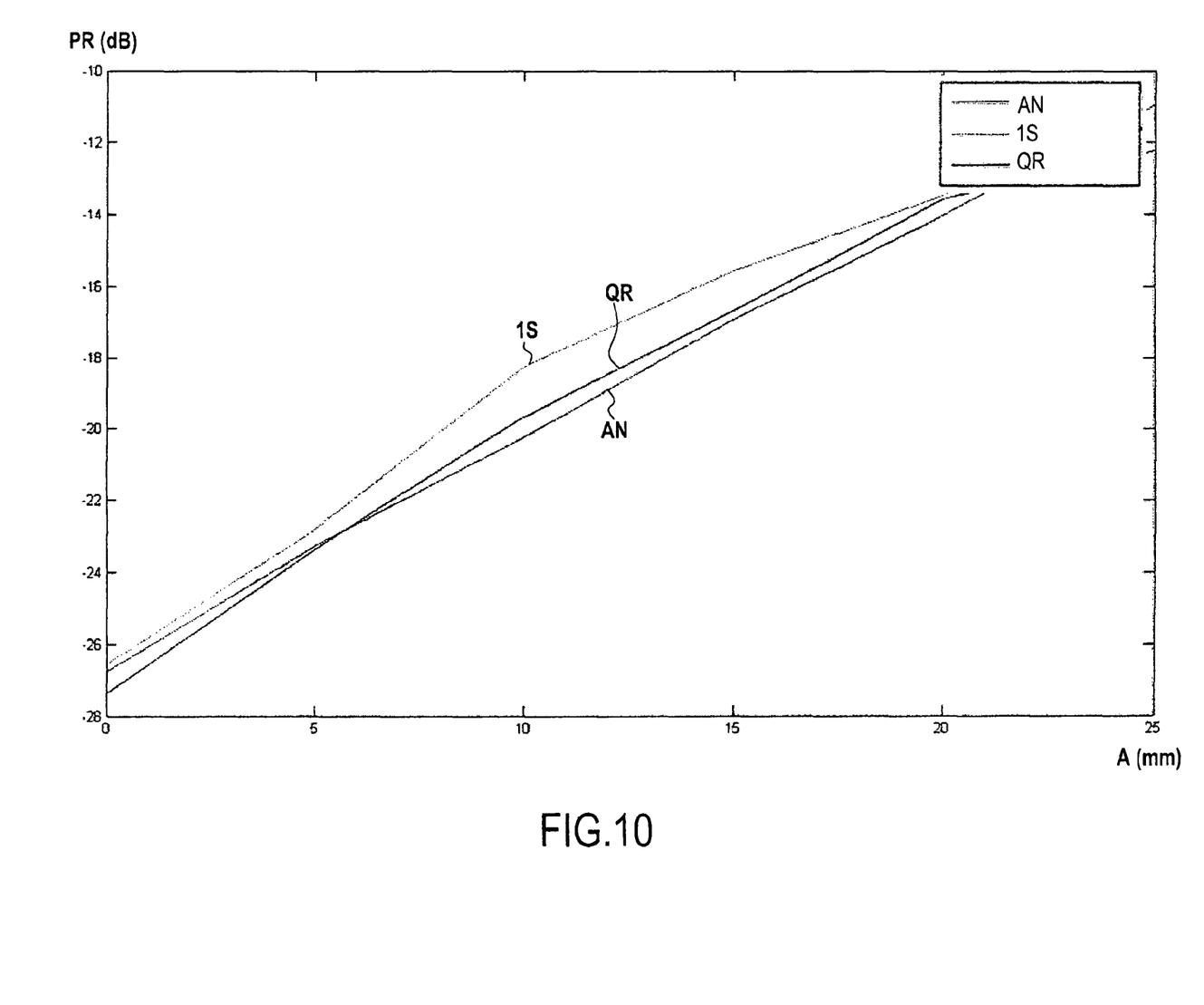
FIG. 10 represents the ratio between the maximum power of the secondary lobes in the focal plane and the power at the focal point according to the angulation distance, on the Oy axis for example, expressed in mm.

FIG. 10 represents the maximum relative power PR of the lobes observed in the focal plane, in decibels in relation to the amplitude of the pressure at the focal point, in accordance with angulation A, on the Oy axis for example, expressed in mm. These relative powers PR correspond to three implementations, two according to the prior art and one according to the simplified implementation as presented on FIG. 1. The first corresponds to the case of a device supporting transducers that are arranged in an annular manner AN, and the second to the case where the transducers are arranged on a single spiral 1S, and the third to the case where the transducers are arranged in a semi-random manner.

One can see that the arrangement of the transducers in one (or more) spirals results in a behaviour with angulation that is similar to the behaviours observed with the known arrangements of transducers.

Regarding the absolute power of the secondary lobes other than in the case of angulation, an increase in the number of concentric spirals leads to a reduction in the secondary energy lobes in a most unexpected manner.

Thus, in the preferred embodiments of the invention, the number of concentric spirals is increased. The increase in the number of spirals over which the transducers are distributed leads to a spatially more homogeneous distribution of the energy. This has an unexpected, significant and pronounced effect on the magnitude of the secondary lobes.

Figure 11A:
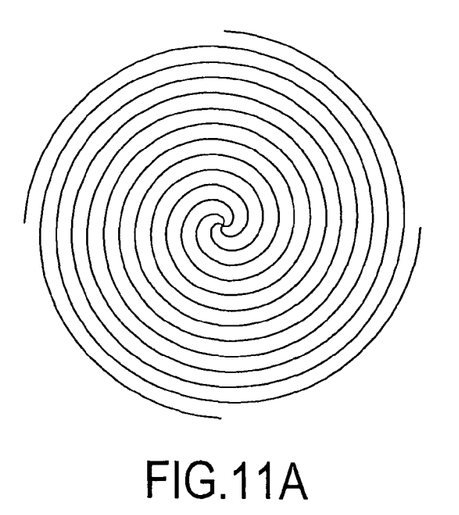
FIGS. 11a, 11b, 11c and 11d illustrate various principles for improving the insonification device presented above. They respectively represent four Concentric Archimedes spirals, four spirals of concentric power angle, four concentric spherical spirals and finally the distribution of the transducers along the four spirals represented in FIG. 11c.
Figure 11B:
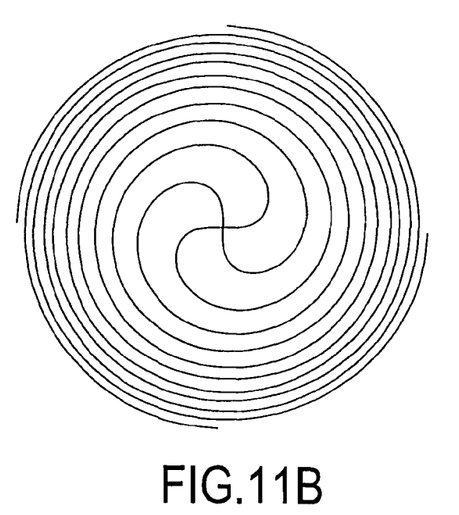

FIGS. 11a and 11b respectively represent four Archimedes spirals and four power angle spirals that are concentric and equidistant from each other. In order to create the insonification device according to the invention, these spirals are then projected onto the three-dimensional concave area 10 and the transducers are placed along these spirals.

Figure 11C:
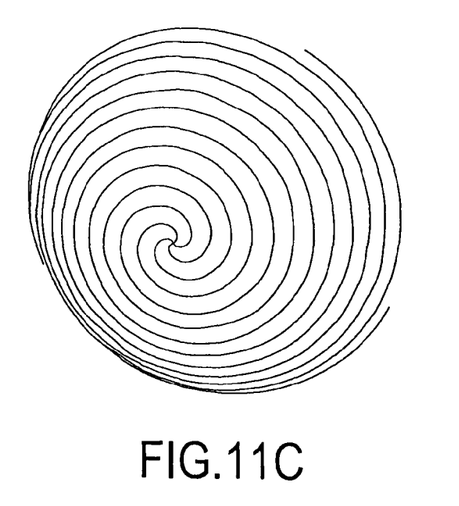
Figure 11D:
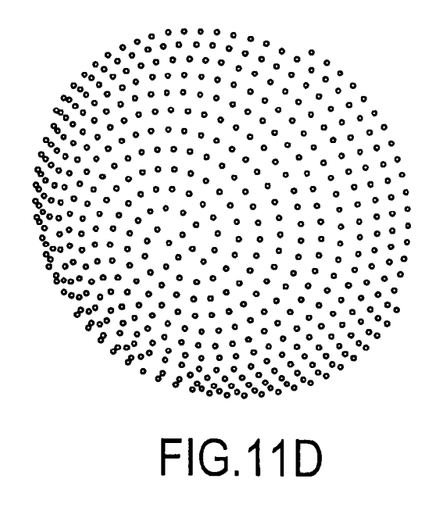

FIGS. 11c and 11d respectively represent, in perspective, four concentric spherical Clelia spirals that have the same distance between them, and the distribution of a network of N transducers on these four spirals.

Figure 12A:
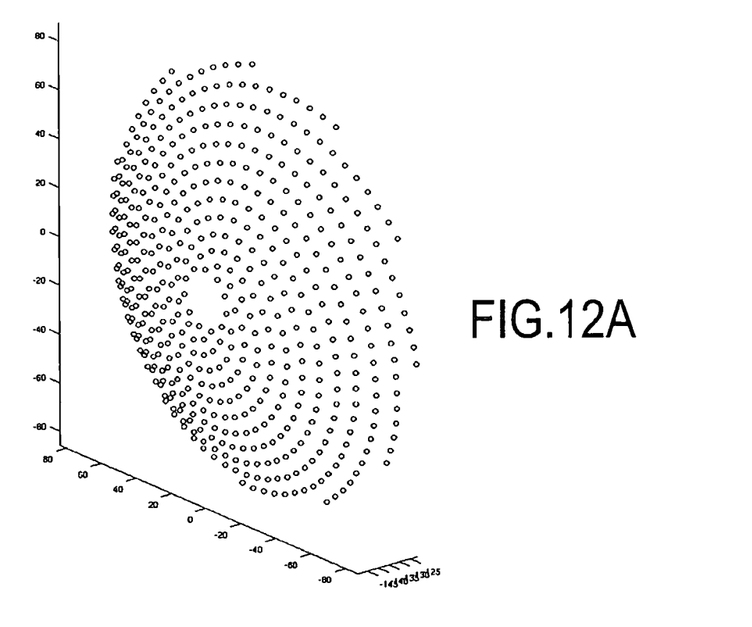
FIGS. 12a and 12b schematically represent two distributions of a given number of transducers on eleven concentric spirals for two three-dimensional concave surfaces with different openings and sizes.
Figure 12B:
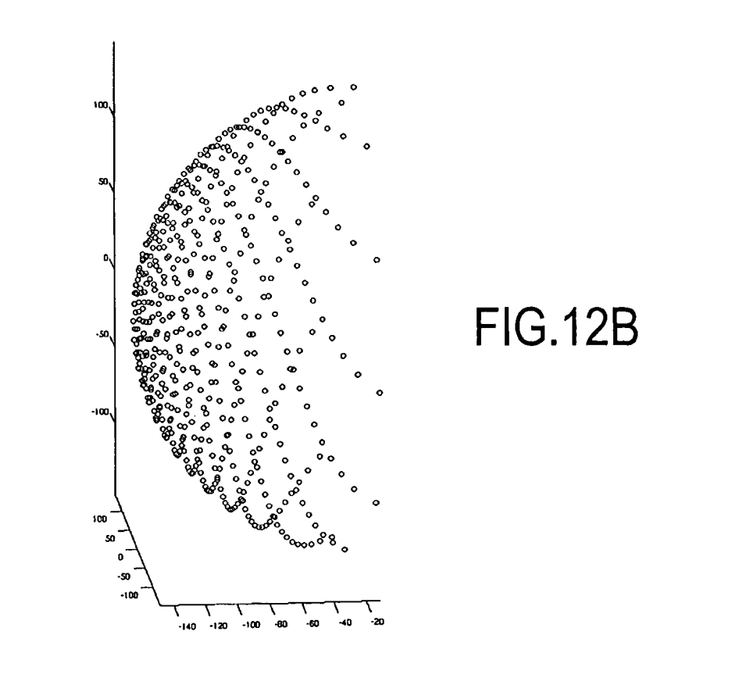

FIGS. 12a and 12b represent, in perspective, two probes of different size, on which are implemented N=512 transducers placed along eleven concentric spirals. Here, the eleven concentric spirals are obtained by orthogonal projection of eleven Archimedes spirals onto the three-dimensional concave area.

The insonification device of FIG. 12a has an overall diameter of 180 mm, while the insonification device of FIG. 12b has an overall diameter of 300 mm. Their radii of curvature are identical. Since the number of transducers is identical in each case, due to the projection and the increase in the surface, they are therefore more distant overall from each other in FIG. 12b than in FIG. 12a.

It can be seen very clearly on these distributions of the transducers obtained with an orthogonal projection of eleven flat spirals onto a three-dimensional concave area that the greater the overall diameter of the probe the more crucial the problem of the distance disparity of the transducers, between the central zone ZC of the three-dimensional concave area 10 and its peripheral zone ZP. In fact on the periphery of the probe of FIG. 12b, it can be seen that the transducers 12 are further apart, between transducers supported by two distinct spirals than between successive transducers supported by the same spiral.

It will be seen, in this context, that the use of spherical spirals or of stereographic projection of the flat spiral or again of an orthogonal projection of a spiral in angle powers will be the most useful.

Figure 13:
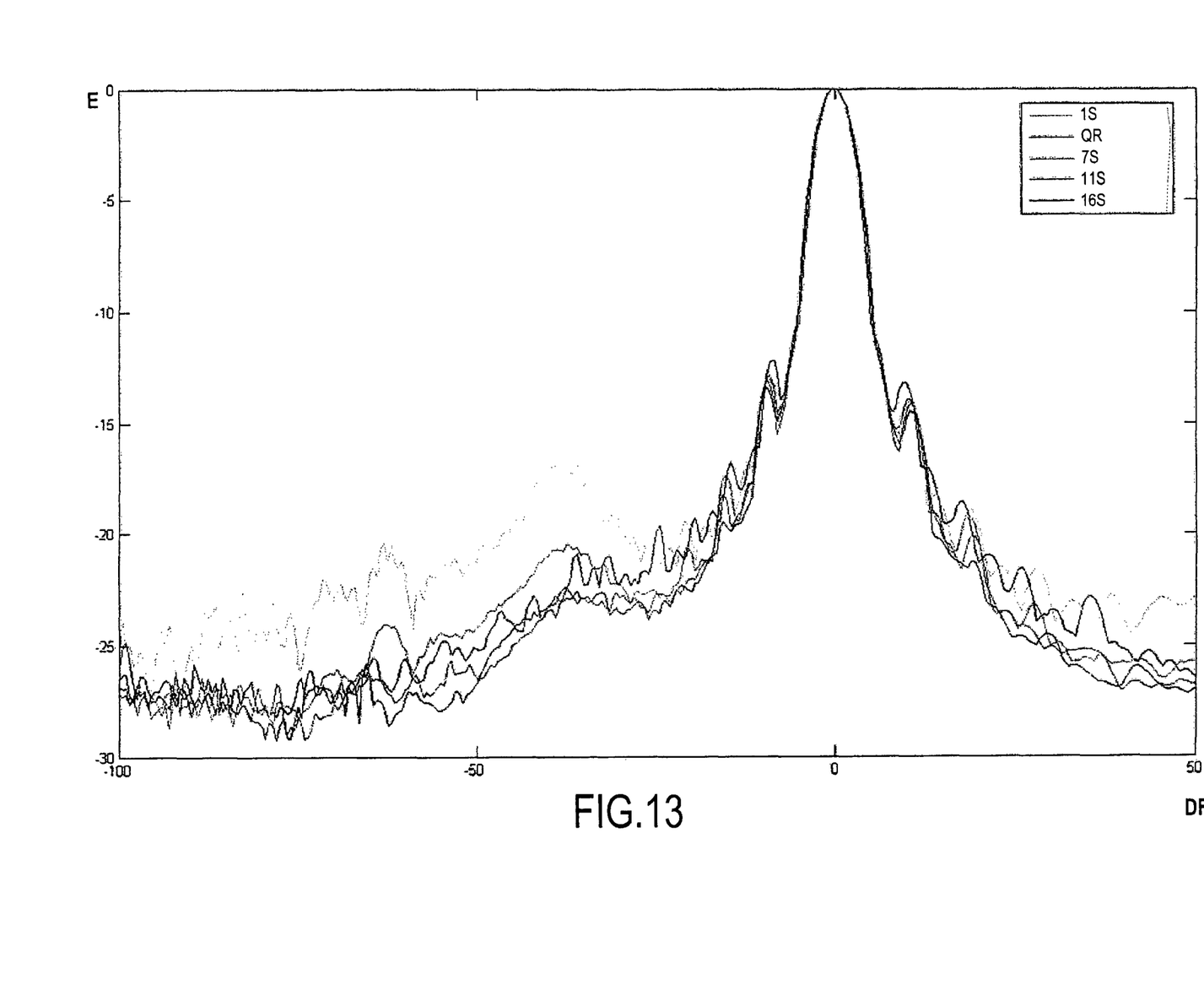
FIG. 13 represents the energy received into the environment in the near field expressed in decibels in relation to the energy at the focal point, around the focal axis, as a function of the distance to the focal point, for an insonification device of the prior art and for four embodiments of an insonification device according to the invention.

FIG. 13 represents the distribution of energy in the near field for an insonification device with a single spiral 1S, and which has a semi-random distribution QR of the transducers 12, a distribution of the transducers in seven spirals 7S, in eleven spirals 11S, and in sixteen spirals 16S. It can be seen that the reduction in the secondary lobes is more pronounced for the insonification devices that have a distribution of the transducers on eleven spirals 11S or on sixteen spirals 16S. It can also be seen that the energy is in fact better distributed in these last two cases.

In order to reduce the appearance of the secondary lobes, it was discovered in the invention that it is effective to introduce a random element into the positioning of the transducers on either side of the linear structure formed by the spiral.

Figure 14:
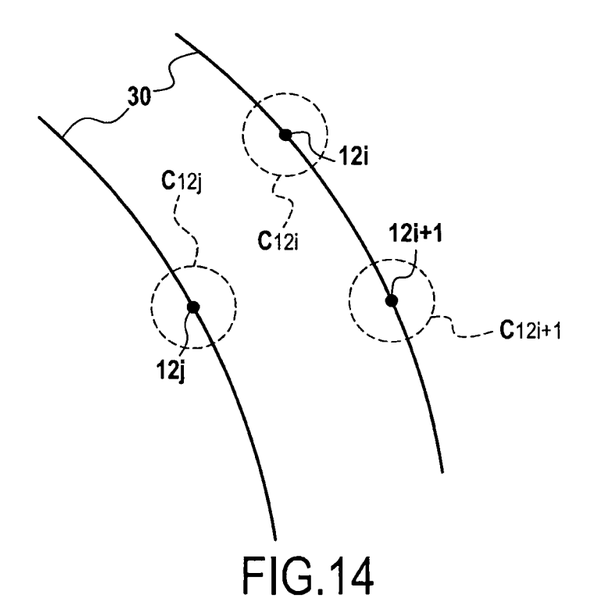
FIG. 14 illustrates the principle of introducing a random character into the positioning of the transducers on either side of the linear structure formed by the spiral.

FIG. 14 illustrates this characteristic. This figure represents two portions of turns of a spiral 30. When the theoretical positions of the transducers $12i$, $12i+1$, $12j$ is determined on the trajectory of the spirals in order to create a homogeneous spatial distribution of the transducers, and represented by crosses, the actual position of the transducers is determined randomly in the surface formed by a disk $C12i$, $C12i+1$, $C12j$ whose centre is determined by the theoretical placements of the transducers. The radius of the disk is of the order of the wavelength of the waves emitted by the transducers in the focussing environment.

Advantageously, the latitude of random positioning of the transducers on either side of the spiral is limited to one wavelength on each side of the linear structure of the spiral.

This characteristic introduces an additional rupture of symmetry which is beneficial from the viewpoint of the spatial distribution of the energy emitted by the insonification device. It turns out that this symmetry break produces a more pronounced result as the angulation of the beam increases. In fact, the appearance in the near field of symmetrical lobes of the beam, in relation to the natural focal axis of the insonification device, is then limited.

It can be observed finally that many different implementations are possible while remaining within the principles of the invention.

The invention claimed is:

1. A device for the insonification of a medium, which is designed to generate a beam of focused waves around a point in a focus zone, used for imaging of the medium or changing the properties of the medium, where the insonification device includes an intrinsic or extrinsic support structure on which is installed a network of a predetermined number of ultrasound transducers which are designed to be controlled independently for the generation of the focused wave beam, wherein the transducers used for the generation of the focused wave beam are wide transducers with dimensions that are greater than a few wavelengths, located at regular intervals along at least two concentric Archimedes's spirals wound onto a three-dimensional concave surface of the support, with the winding of the spirals and the positions of the transducers on the spirals being chosen so that the spatial distribution of the transducers over the three-dimensional surface is homogeneous, with the shape and the size of the three-dimensional surface also being chosen to allow optimal focusing of the beam at a predetermined focal length, and with the concave side of the three-dimensional surface being oriented toward the focus zone.

2. A device according to claim 1, wherein the three-dimensional surface is a portion of a sphere of radius (R) equal to the wanted focal length.

3. A device according to claim 1, wherein the number of spirals is between two and twenty.

4. A device according to claim 3, wherein the number of spirals is between seven and thirteen.

5. A device according to claim 1, wherein the spirals are flat, arranged in a plane, and projected onto the three-dimensional concave surface.

6. A device according to claim 1, wherein the spirals are spherical Archimedes's spirals defined on a sphere.

7. A device according to claim 6 wherein the spirals are chosen from Clelia spirals, the three-dimensional curves defined by polar coordinates, where θ is the angular variable and R is the radius of the sphere:

$$x = R \cos m\theta \cos \theta;\ y = R \cos m\theta \sin \theta;\ z = R \sin m\theta.$$

8. A device according to claim 1, wherein the support structure is intrinsic, and composed of a piezoelectric or semiconductor material whose surface is three-dimensional and concave, with the piezoelectric or semiconductor material being divided into a multiplicity of independent transducer elements of which only some, located along at least two concentric spirals, wound onto the three-dimensional concave surface of the piezoelectric or semiconductor material, are activated in order to create the focused beam.

9. A device according to claim 1, wherein the size and the shape of the three-dimensional concave surface is determined in accordance with the minimum size and the shape of the focal footprint wanted around the focus point (O).

10. A device according to claim 1, wherein the distribution of the transducers along the spirals having been determined, the position of the center of the transducers is adjusted randomly on the surface formed by a disk whose center is the initial position of the center of the transducer determined beforehand, and the radius is less than or equal to the wavelength in the focusing medium.

* * * * *